United States Patent
Kawahara et al.

(10) Patent No.: US 9,459,611 B2
(45) Date of Patent: Oct. 4, 2016

(54) WIRE ELECTRIC DISCHARGE MACHINE HAVING PEAK CURRENT COMPENSATION FUNCTION

(71) Applicant: FANUC CORPORATION, Minamitsuru-gun, Yamanashi (JP)

(72) Inventors: Akiyoshi Kawahara, Yamanashi (JP); Hiroyuki Furukawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 399 days.

(21) Appl. No.: 14/079,122

(22) Filed: Nov. 13, 2013

(65) Prior Publication Data

US 2014/0135974 A1    May 15, 2014

(30) Foreign Application Priority Data

Nov. 13, 2012  (JP) ................. 2012-249541

(51) Int. Cl.

| G05B 19/18 | (2006.01) |
|---|---|
| B23H 1/02 | (2006.01) |
| B23H 7/02 | (2006.01) |
| B23H 7/14 | (2006.01) |

(52) U.S. Cl.
CPC ............. *G05B 19/18* (2013.01); *B23H 1/02* (2013.01); *B23H 7/02* (2013.01); *B23H 7/14* (2013.01)

(58) Field of Classification Search
CPC ..................................... G05B 19/18
USPC ....................... 219/69.13; 700/162
See application file for complete search history.

(56) References Cited

U.S. PATENT DOCUMENTS

| 5,185,507 A | 2/1993 | Yasui |
|---|---|---|
| 5,233,147 A | 8/1993 | Magara |
| 6,806,434 B1 | 10/2004 | Suzuki et al. |
| 2005/0040142 A1 | 2/2005 | Kawahara et al. |
| 2006/0163210 A1 | 7/2006 | Asai et al. |
| 2008/0251500 A1 | 10/2008 | Hiraga et al. |

FOREIGN PATENT DOCUMENTS

| CN | 1583337 A | 2/2005 |
|---|---|---|
| CN | 101284322 A | 10/2008 |
| CN | 102078990 A | 6/2011 |
| CN | 102639273 A | 8/2012 |
| EP | 2327498 A2 | 6/2011 |

(Continued)

OTHER PUBLICATIONS

Decision to grant a patent mailed Jul. 1, 2014, corresponds to Japanese patent application No. 2012-249541.

(Continued)

*Primary Examiner* — Tejal Gami
(74) *Attorney, Agent, or Firm* — Hauptman Ham, LLP (57) ABSTRACT

A wire electric discharge machine is configured to machine a workpiece by computing an electric current at the machining time before starting a main machining and compensating a power source voltage for machining. The wire electric discharge machine measures an average electric current and an electric discharge frequency at the machining time, in a measuring section in an approach before the main machining, and computes a peak current at the machining time. Further, an electric voltage of a machining power source is compensated by comparing the computed peak current at the machining, with a reference peak current.

9 Claims, 5 Drawing Sheets

(56) References Cited

FOREIGN PATENT DOCUMENTS

| EP | 2327498 A3 | 10/2011 |
|----|------------|---------|
| JP | 5163094 A | 6/1976 |
| JP | S59205228 A | 11/1984 |
| JP | 4189421 A | 7/1992 |
| JP | 58122 A | 1/1993 |
| JP | 8118146 A | 5/1996 |
| JP | H10138048 A | 5/1998 |
| JP | H1148042 A | 2/1999 |
| JP | 3820989 B2 | 9/2006 |

OTHER PUBLICATIONS

Office Action mailed May 5, 2015, corresponding to Chinese patent application No. 201310559634.6.

```
%
O0001
G92X0Y0      ← START PROGRAM
G91G01Y10
M**          ← CODE INDICATING MAIN MACHINING START
G41G01Y-1.   ← START MAIN MACHINING
....
....
....
```

FIG.9

```
%
O0001
G92X0Y0      ← START PROGRAM
G91G01Y10    ← OFFSET IS INVALID
G41G01Y-1.   ← OFFSET IS VALID

WIRE ELECTRIC DISCHARGE MACHINE HAVING PEAK CURRENT COMPENSATION FUNCTION

RELATED APPLICATIONS

The present application claims priority to Japanese Application Number 2012-249541, filed Nov. 13, 2012, the disclosure of which is hereby incorporated by reference herein in its entirety.

BACKGROUND OF THE INVENTION

1. Field of the Invention

The present invention relates to a wire electric discharge machine having a function of compensating a machining current pulse of a wire electric discharge machine.

2. Description of the Related Art

The wire electric discharge machine machines a workpiece into a desired shape by applying an electric voltage between a wire electrode and the workpiece to generate electric discharge between them, while changing a relative position between the wire electrode and the workpiece. Generally, in the electric discharge machining of the workpiece, a required precision varies according to a material of the workpiece or a thickness of the workpiece, however, a precision in several microns order may be often required as a higher precision.

Figure 10:
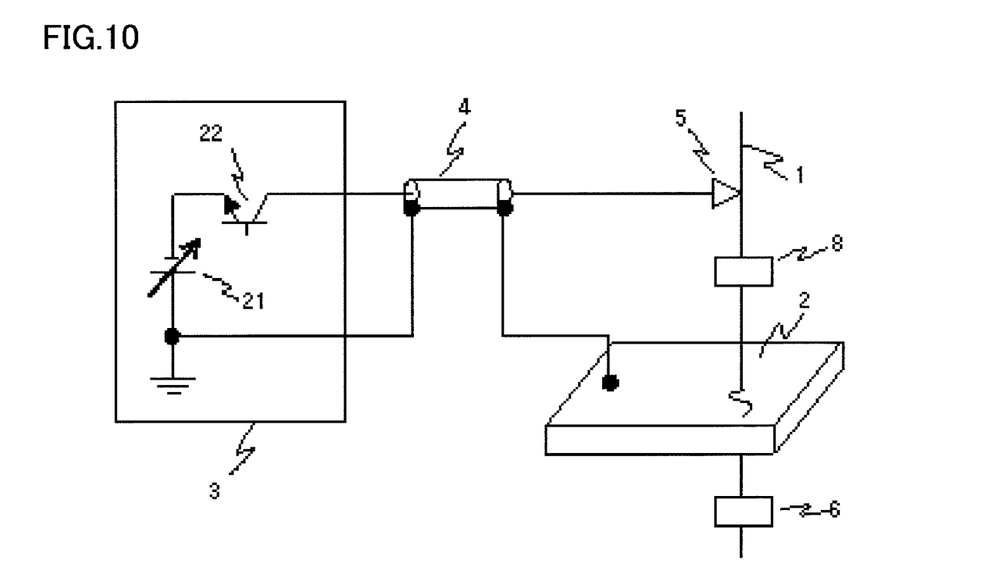
FIG. 10 is a view showing a conventional general wire electric discharge machine.

An example of a general wire electric discharge machine will be shown in FIG. 10.

A machining power source 3 includes a direct voltage source 21 and a switching element 22 which changes an electric voltage supplied from the direct voltage source 21 to a high frequency pulse. The generated high frequency pulse is fed to an electric supply portion 5 via an electric supply line 4, and is applied to a side of a wire electrode 1 which is supported by a wire electrode support portion 8, and a side of a workpiece 2.

Since the pulse applied to the side of the wire electrode 1 and the side of the workpiece 2 has a high frequency, the electric supply line 4 equivalently includes an inductance component. Further, the inductance component varies dependent upon the attitude of an electric supply line 4 and the like. Further, a distance from the electric supply portion 5 to an electric discharge point (that is, of an electric discharge route) is different according to the relative position between the wire electrode 1 and the workpiece 2, and a resistance component is differentiated by the difference. The way of flowing of electric current is differentiated by the change of the impedances of these electric discharge routes. There is a problem that the difference of the way of flowing of electric current directly affects a machining speed and a machining precision.

With regard to the problem that the way of flowing of electric current varies according to the relative position between the wire electrode and the workpiece, or the state of a subject to be machined, a technique of detecting a peak current and output voltage so as to compare the detected values with reference values, and adjusting the output voltage according to the result of comparison is disclosed in Japanese Patent Application Laid-Open No. 59-205228 or Japanese Patent No. 3820989. However, in these techniques, since the output voltage is adjusted by detecting the peak current and the output voltage or the like, and thereafter comparing the detected values with the reference values, a time delay is generated from the detection of the peak current or the output power to the reflection of the detected value on the adjustment of the output voltage. As a result, it is hard to perform a highly precise control so as to obtain a machining result having a high precision.

Further, Japanese Patent Application Laid-Open No. 10-138048 discloses a technique of measuring and compensating an average open voltage between an electrode and a workpiece in an open state in which a machining gap is spaced at a predetermined distance before carrying out the machining, and comparing the measured and compensated voltage with a previously stored reference voltage. However, this technique controls only such open voltage in the wire electric discharge machining, and does not compensate the electric current which actually contributes to the machining. Therefore, there is a case that a desired result of machining cannot be obtained in an actual machining.

Further, Japanese Patent Application Laid-Open No. 10-138048 discloses a technique of machining under a plurality of machining states, actually measuring machining information in each of the machining conditions, determining a machining characteristic of an electric discharge machine based on a machining condition and an actually-measured machining information in the machining condition, and compensating the machining condition and the machining information. However, the technique determines the machining characteristic of the electric discharge machine by actually measuring the machining information in the actual machining, and corrects the machining condition and the machining information based on the machining characteristic, however, the technique has a problem that it is impossible to compensate a state of the workpiece and an influence exerted by a jig.

SUMMARY OF THE INVENTION

Accordingly, an object of the present invention is to provide a wire electric discharge machine which can perform a machining by computing an electric current at the machining time on the basis of an average electric current and an electric discharge frequency before machining (mainly machining) a shape desired as a product, and compensating a power source voltage for machining, before starting a wire electric discharge machining.

A wire electric discharge machine according to the present invention machines applies electric voltage between a wire electrode and a workpiece to generate electric discharge between them, while changing a relative position between the wire electrode and the workpiece, thereby machining the workpiece into a desired shape. The wire electric discharge machine comprising: a first detecting unit that detects an average electric current; a second detecting unit that detects an electric discharge frequency; a determining unit that determines, when starting a machining, whether or not the machining is a machining in an approach up to a shape required as a product; a computing unit configured to set a measuring section for measuring an average electric current and an electric discharge frequency at the time when machining is carried, in the approach, when the determining unit determines that the machining is carried out in the approach, and compute a peak current at the time when machining is under way, on the basis of the average electric current and the electric discharge frequency detected when machining is carried out in the set measuring section; a memory unit that stores a reference peak current; a comparing unit that compares the peak current at the time when machining is under way, obtained by the computation by the computing unit, with the reference peak current stored in the memory unit; and a compensation voltage calculating unit that calculates an electric voltage of a machining power source for compensating the peak current at a portion where machining of the machined shape is carried out, on the basis of a result of comparison by the comparing unit.

According to the wire electric discharge machine, since the electric voltage of the machining power source is calculated by using a section of an approach in the workpiece up to the shape which is necessary for the product, as the measuring section, it is possible to perform compensation while taking into consideration the influence of the workpiece. Further, compensation of the power source voltage is performed according to the result of measurement in the section just before the main machining, it is possible to perform the compensation with a high degree of accuracy, without any delay. Further, by determining whether the machining route is an approach or not, before the measurement, the compensation value is neither computed nor input in the case where the main machining is already performed when the machining is started.

The determining unit may determine whether a machining route is the approach or not on the basis of a code in an NC program of the wire electric discharge machine.

When the determining unit determines that the machining under way is the machining in the approach, a section in which a control dedicated for the approach is not valid may be set to the measuring section.

The computing unit may be configured to compute the peak current at the time when machining is under way, on the basis of an integral value of the average electric current, assuming that the peak current value at a time when the average electric current and the electric discharge frequency are measured is constant.

The compensation voltage calculating unit may be configured to calculate an electric voltage of a machining power source on the basis of a ratio or difference between the peak current obtained by the computation by the computing unit and the reference peak current stored in the memory unit.

According to the configuration mentioned above, the present invention can provide a wire electric discharge machine which is configured such that the machining can be performed by computing the electric current at the machining time on the basis of the average electric current and the electric discharge frequency in the machining before machining the shape desired as the product, and compensating the power source voltage for machining, before starting the wire electric discharge machining.

BRIEF DESCRIPTION OF THE DRAWINGS

The above objects and feature and the other objects and features of the present invention will be apparent from the following description of embodiments with reference to the accompanying drawings. Among these drawings.

DETAILED DESCRIPTION OF THE PREFERRED EMBODIMENTS

First Embodiment

Examples of machining by a first embodiment of a wire electric discharge machine is explained with reference to FIGS. 1 and 2.

Figure 1:
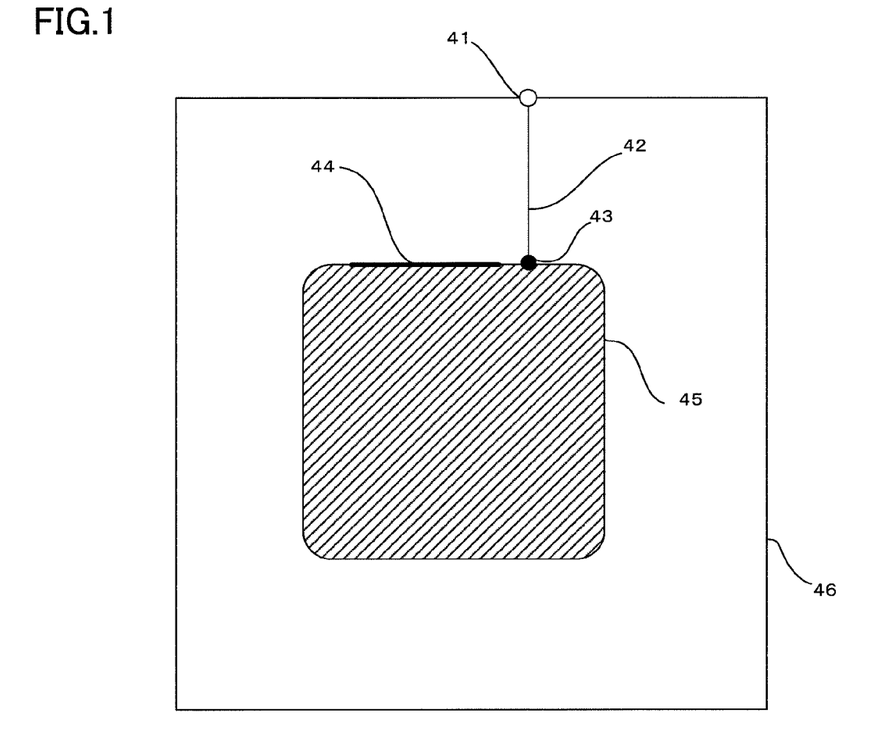
FIG. 1 is a view illustrating an example of machining a punch shape by a wire electric discharge machine.

FIG. 1 is a view illustrating an example of machining a punch shape by a wire electric discharge machine. Reference numeral 41 denotes a machining start point, reference numeral 42 denotes an approach, reference numeral 43 denotes a main machining start point, reference numeral 44 denotes a cut-off portion, reference numeral 45 denotes a shape of a machined product, and reference numeral 46 denotes a cut-off portion.

Figure 2:
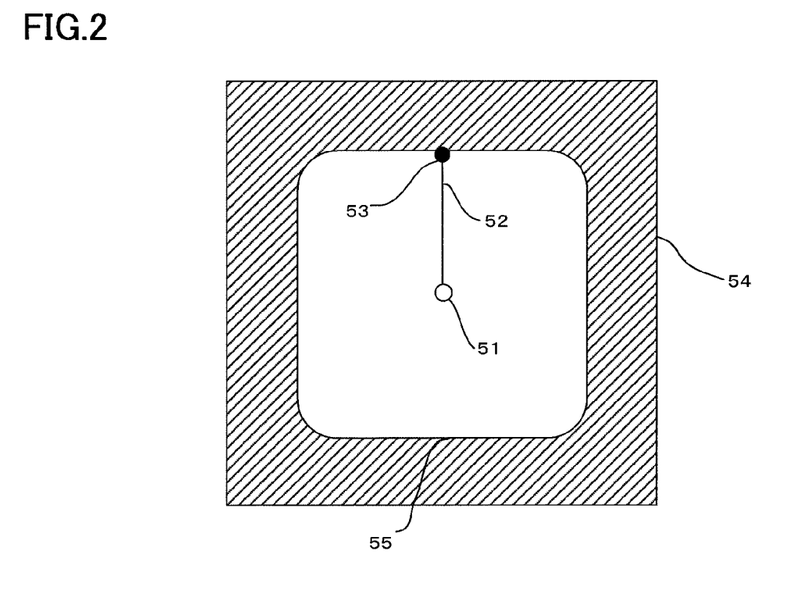
FIG. 2 is a view illustrating an example of machining a die shape by the wire electric discharge machine.

FIG. 2 is a view illustrating an example of machining a die shape by the wire electric discharge machine. Reference numeral 51 denotes a machining start point, reference numeral 52 denotes an approach, reference numeral 53 denotes a main machining start point, reference numeral 54 denotes a shape of a machined product, and reference numeral 55 denotes a cut-off portion.

An inner side of a machining route is used as a machined product in the machining in FIG. 1. In this machining of the punch shape, the cut-off portions 44 and 46 are previously set, the machined product shape 45 is cut off, and then a boundary portion between the machined product shape 45 and the cut-off portion 44 is finished by grinding and the like, in general. On the other hand, in the machining as shown in FIG. 2 (in the machining of a die shape), an outer side of the machining route is used as a machined product.

In both of the machining of the punch shape in FIG. 1 and the machining of the die shape in FIG. 2, the machining of a section which is not necessary as the product (such a section is hereinafter referred to as approach) is generally set before the machining of a shape which is necessary as the product (such machining is hereinafter refer to as main machining).

In the example of the machining of the punch shape as shown in FIG. 1, a section between the machining start point 41 and the main machining start point 43 is the approach 42, whereas, in the example of the machining of the die shape in FIG. 2, a section between the machining start point 51 and the main machining start point 53 is the approach 52. In both of the cases in FIGS. 1 and 2, a compensation value is determined on the basis of information when the approaches 42 and 52 are machined.

First of all, it is determined whether a point at which a machining is started is a point located behind the point at which the main machining is started or a point located in front of the point at which the main machining is started. In the case where the machining is started for the first time after installing a workpiece, the main machining is not started at the point (for example, the machining start point 41 as shown in FIG. 1) at which machining is started. On the other hand, for example, in the case where a wire disconnection is generated during the main machining, and the machining is started after recovery of the wire disconnection (that is, after the wire is connected), a point at which a machining is started (restarted) is a point located in front of the point at which the main machining is started. As mentioned above, it is determined whether a point at which a machining is started is a point located behind the point at which the main machining is started or a point located in front of the point at which the main machining is started.

In the case where it is determined that a point at which a machining is started is a point located behind the point at which the main machining is started, a machining section for measuring (hereinafter refer to as measuring section) is decided in the approach 42. In general machining by wire electric discharge machines, there is a case that "special dedicated control", applied only to the approach 42, is performed just after starting a machining along the approach 42, or just before finishing a machining along the approach 42. In the case where the special dedicated control is valid, there is a case that an electric current contributing to the machining is a subject to be controlled. The measurement for deciding the current compensation value according to the present invention is performed in a section in which "special dedicated control" in the approaches is not valid.

In the case where a point at which a machining is started is determined to be a point located in front of the point at which the main machining is started, the main machining is directly performed. In this case, since the compensation value is already decided before starting the main machining which is already performed, computation and input of the compensation value are not performed when the current main machining is performed.

On the other hand, in the case where a point at which a machining is started is determined to be a point located behind the point at which the main machining is started, the average electric current and the electric discharge frequency at the time when the actual machining is performed are measured, after reaching a measuring section (a machining section for measuring in the approach 42). Thereafter, the measurement is finished at a point of time an aggregate calculation of data necessary for computing is completed, and the electric current contributing to the machining is computed.

Figure 4:
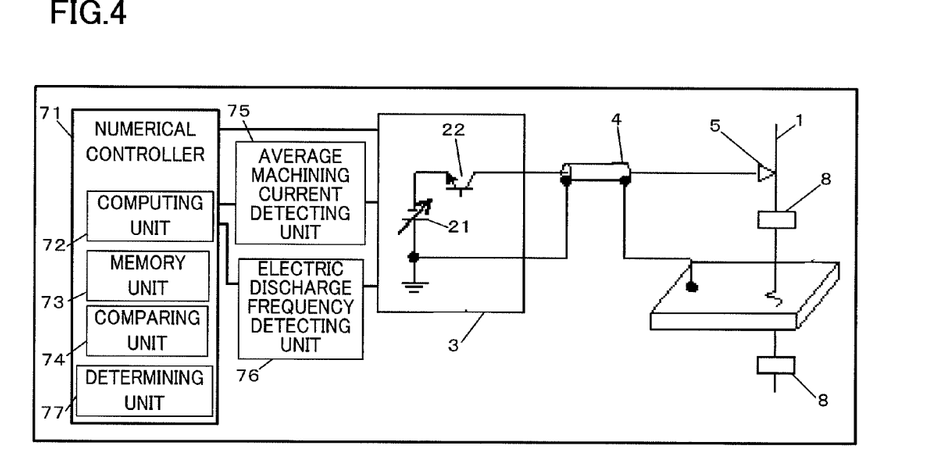
FIG. 4 is a view illustrating an outline of a first embodiment of a wire electric discharge machine having a peak current compensation function according to the present invention.

In general, wire electric discharge machines have standard machining conditions. These standard machining conditions are obtained by a result of tests by a wire electric discharge machine manufacturer. The wire electric discharge machine manufacturer machines workpieces for testing, and adjusts machining conditions so as to obtain a desired result of machining. The electric current contributing to the machining that is carried out when the standard machining conditions were acquired is stored in a memory unit 73 of a numerical controller 71 in advance (FIG. 4).

The electric current contributing to the machining in the approach 42 mentioned above is compared with the electric current contributing to the machining that is carried out when the standard machining conditions were acquired, which are previously stored in the numerical controller 71. If the electric current contributing to the machining in the approach 42 is absolutely identical to the electric current contributing to the machining that is carried out when the standard machining conditions were acquired, it is not necessary to correct the electric current contributing to the machining, however, in the case where they are different from each other, the electric current contributing to the machining is adjusted by changing the electric voltage of the machining power source.

The value for changing the electric voltage of the machining power source is stored as a compensation value in the memory unit 73 in the numerical controller 71, and is set as the compensation value of the machining voltage before starting the main machining.

As a result, prior to start of the main machining, a state in which the compensation value has been set is achieved, and the main machining is performed by applying the compensation value to the standard conditions which are set at a time when the main machining is started (that is, by modifying the set standard conditions). With regard to one shape, the same compensation value is used during the main machining (that is, the current set machining conditions are not modified in process of the main machining).

Figure 3:
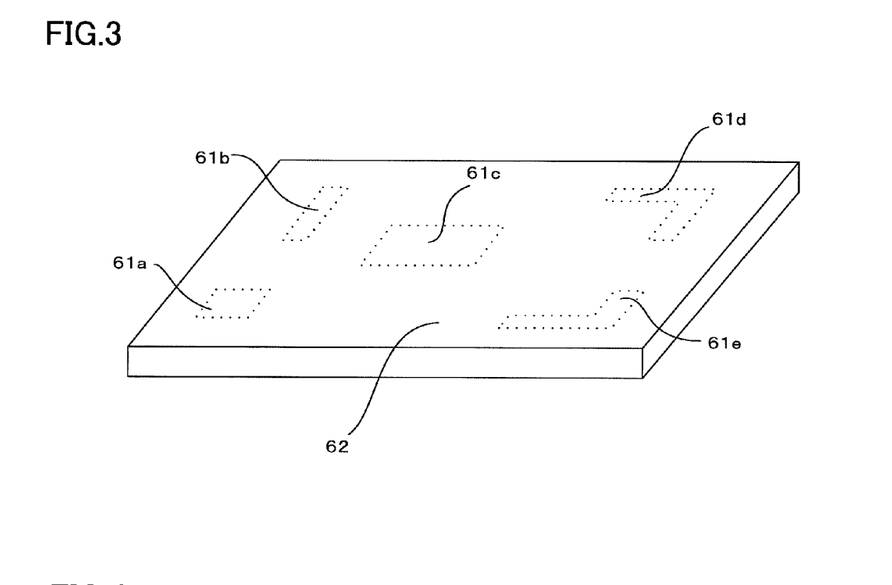
FIG. 3 shows an example of machining in the case where a plurality of shapes are machined in one workpiece, in the machining of the die shape by using the wire electric discharge machine.

Generally, in the case of machining punch shapes as shown in FIG. 1, the machining is completed every one shape. On the other hand, in the case of machining die shapes as shown in FIG. 2, there is a case that a plurality of shapes are machined in one workpiece as shown in FIG. 3. In this case, the similar compensation value is calculated every main machining applied to each of the machined shapes.

An outline of the first embodiment of the wire electric discharge machine having peak current compensation function according to the present invention is explained with reference to FIG. 4.

The wire electric discharge machine as shown in FIG. 4 corresponds to a conventional wire electric discharge machine as shown in FIG. 10 to which an average machining current pulse detecting unit 75, an electric discharge frequency detecting unit 76, the numerical controller 71, a computing unit 72, the memory unit 73, a comparing unit 74, and a determining unit 77 are added.

Figure 5:
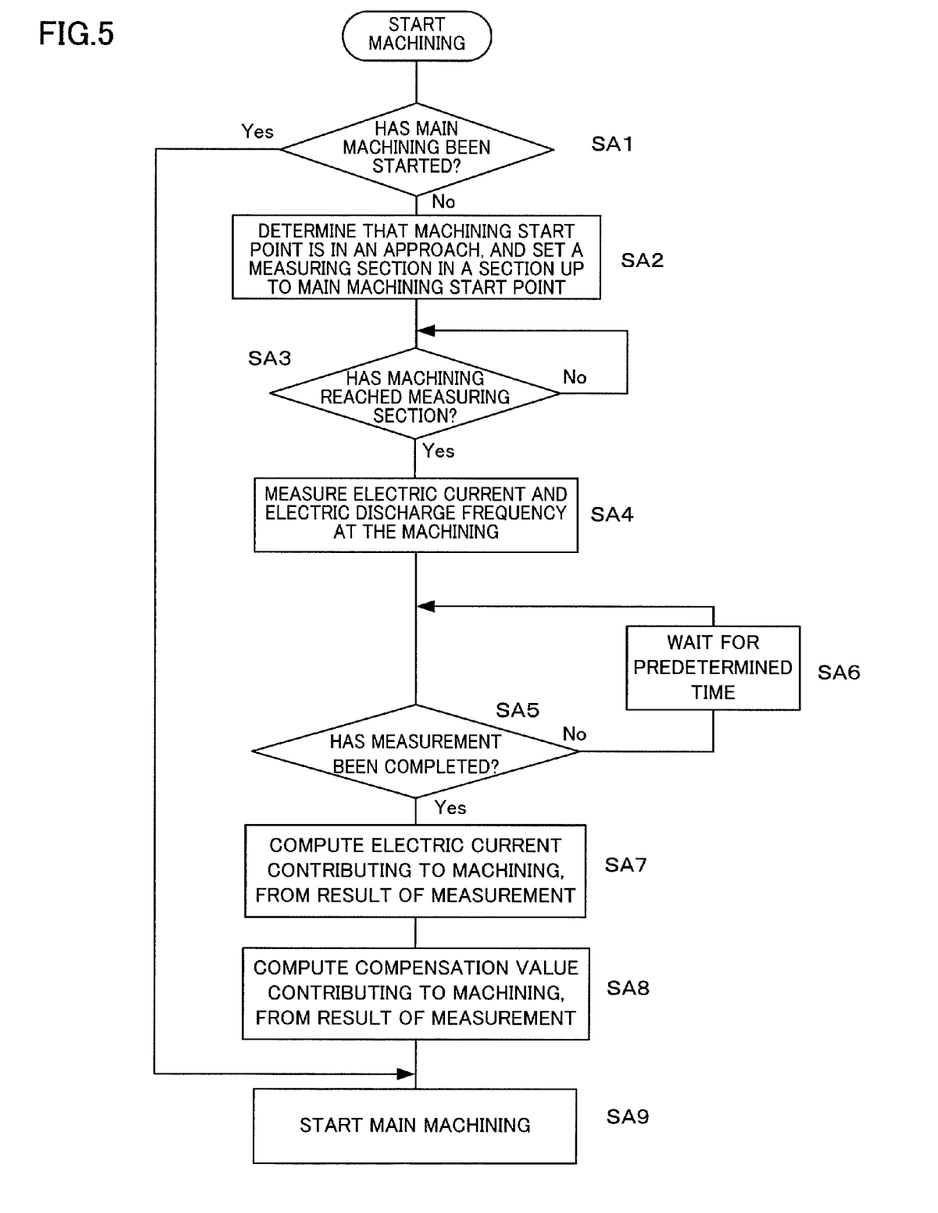
FIG. 5 is a flow chart showing a computing process of a compensation value of machining voltage by the wire electric discharge machine shown in FIG. 4.

FIG. 5 is a flow chart showing a computing process of the compensation value of the machining voltage by the wire electric discharge machine shown in FIG. 4. A description of a process in each of steps will be given below.

(Step SA1) When the machining is started, it is determined whether the point at which a machining is started is a point located behind the point at which the main machining is started or a point located in front of the point at which the main machining is started. If the point is determined to be a point located behind the point at which the main machining is started (No), the process proceeds to Step SA2. On the other hand, if the point is determined to be a point located in front of the point at which the main machining is started (Yes), the process proceeds to Step SA9, and the main machining is started without computing or inputting the compensation value. How to determine whether the main machining is started or not will be described later.

(Step SA2) It is determined that the point at which a machining is started lies in an approach, and sets a measuring section in a section in the approach located behind the point at which the main machining is started, other than sections in which "special dedicated control" is required.

(Step SA3) It is determined whether or not the machining reaches the measuring section set in the previous Step SA2, and if the machining does not reach the measuring section yet (No), the process in Step SA3 is repeated until the machining reaches the measuring section, and if the machining reaches the measuring section (Yes), on the other hand, the process proceeds to Step SA4.

(Step SA4) An electric current and an electric discharge frequency at the time when machining is under way are measured in the measuring section.

(Step SA5) It is determined whether the measurement is completed or not. If the measurement is not completed yet (No), the process proceeds to Step SA6, and if the measurement is completed (Yes), on the other hand, the process proceeds to Step SA7.

(Step SA6) The process waits ready for a predetermined time, and thereafter returns to Step SA5.

(Step SA7) The electric current contributing to the machining is computed on the basis of the result of measurement in the measuring section in the previous Step SA4.

(Step SA8) The compensation value contributing to the machining is computed on the basis of the result of measurement in the measuring section in the previous Step SA4. Examples of how to compute the electric current and the compensation value in Steps SA7 and SA8 will be mentioned later.

(Step SA9) The main machining is started.

When the machining is started, it is determined, by using a code in an NC program, whether or not a point at which the machining is started lies in an approach which is located behind the point at which the main machining is started.

Figure 8:
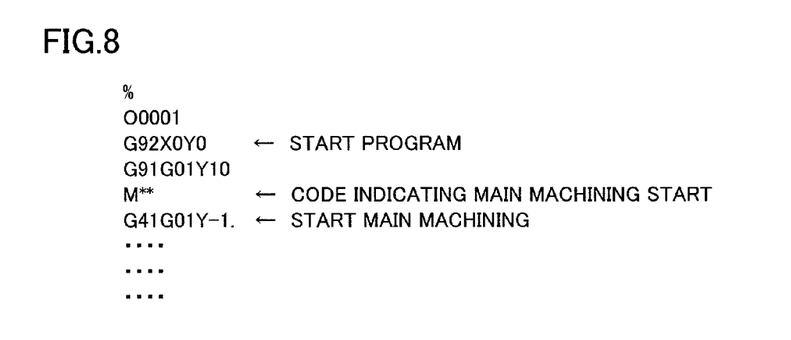
FIG. 8 is a view showing an example of performing determination of an approach by inserting a code for starting a main machining, in an NC program.

For example, as in the case of a program shown in FIG. 8, if a code (M) which shows starting of the main machining during a time interval between a start (G92X0Y0) of the machining program and a start (G41G01Y-1.) of the main machining is contained in the program, then it is possible to determine whether the current point lies in an approach located behind the point at which the main machining is started or in the machining route in which the main machining is under way, based on whether a current program block under execution lies before the code (M) or after the code (M**).

Figure 9:
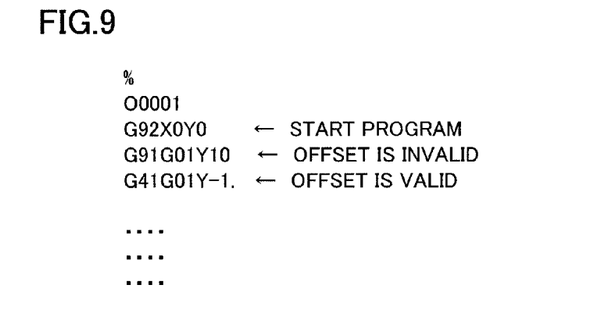
FIG. 9 is a view showing an example of performing determination of an approach on the basis of whether an offset is invalid or not, in the NC program.

As an alternative method, if there is an offset invalidating block (G91G01Y10) or an offset validating block (G41G01Y-1.) after start (G92X0Y0) of the machining program, as in the case of the program shown in FIG. 9, it is possible to determine whether or not a point at which a machining is started lies in an approach located behind the point at which the main machining is started, taking into consideration the fact that an offset during machining is generally made invalid in machining in an approach.

If the main machining has already been started and machining is started for the purpose of restarting the machining, computation and input of the compensation value has already been carried out in an approach located behind the point at which the main machining is started. Therefore, the machining is performed directly (that is, without any computation and input of the compensation value).

Figure 6:
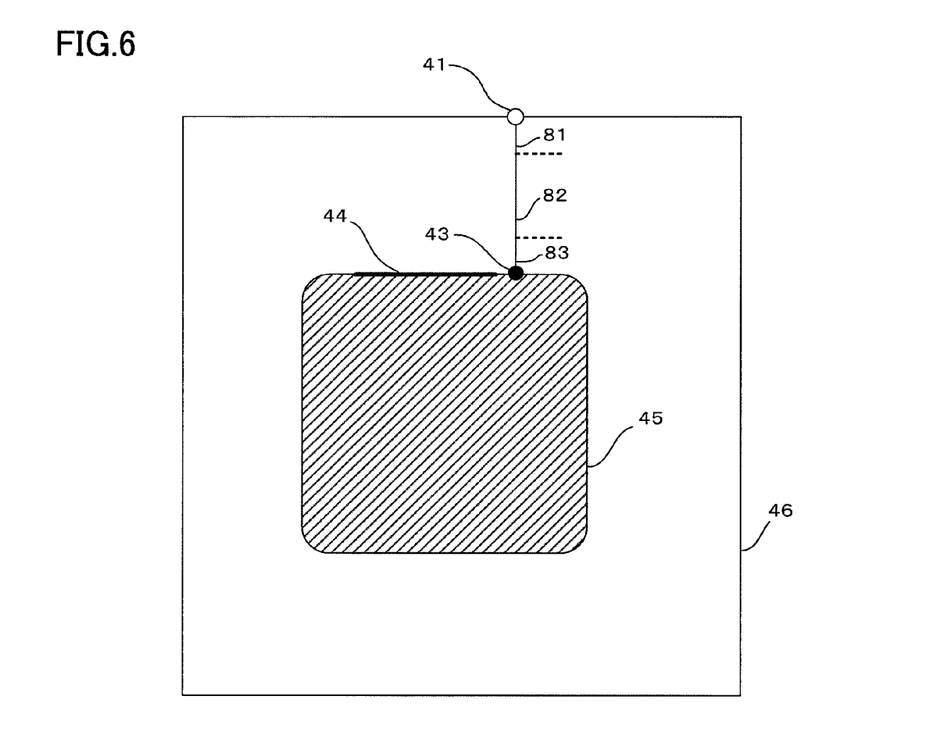
FIG. 6 is a view illustrating a case where an approach is divided into three sections including a first dedicated-control valid section, a measuring section and a second dedicated-control valid section, in the machining example in FIG. 1.

Here, a case where a machining shown in FIG. 6, for example, is carried out is considered, determining that a point at which a machining is started lies in a location before the point at which the main machining is started.

A section (an approach) from a machining start point 41 to a main machining start point 43 is divided into a first dedicated-control valid section 81, a measuring section 82, and a second dedicated-control valid section 83. The remaining section excluding the first and second dedicated-control valid sections 81 and 83 from the approach is set to the measuring section 82.

In wire electric discharge machines, there is a case that "dedicated control" in which a machining speed is lowered for the purpose of preventing disconnection of a wire electrode is made valid in the first and second dedicated-control valid sections 81 and 83 shown in FIG. 6 (showing an example of machining a punch shape). The measuring section 82 is determined to be a section in which the dedicated control in an approach is not valid. Even in the case of machining of die shapes as shown in FIG. 2, there is a case that a section (a dedicated-control valid section) for making "dedicated control" valid is provided in the approach 52, for preventing machined products from being damaged.

Distances (route lengths) of the dedicated-control valid sections 81 and 83 are determined by parameters in advance. If a position at which machining is under way is a distance equal to or more than the first dedicated-control valid section 81 ahead of the machining start point 41 and also is a distance equal to or more than the second dedicated-control valid section 83 short of the main machining start point 43, then it is determined that the position lies in a section in which the dedicated control in an approach is not valid.

Measurement in the measuring section 82 is carried out under time control. Even measurement in the measuring section 82, it is not necessary to carry out the measurement over the entire area of the measuring section 82 as long as the collection of the necessary data is completed. It is determined every predetermined time whether the measurement is completed or not, before the measurement is completed, and the measurement is completed at a time when collection of necessary data is completed.

Figure 7:
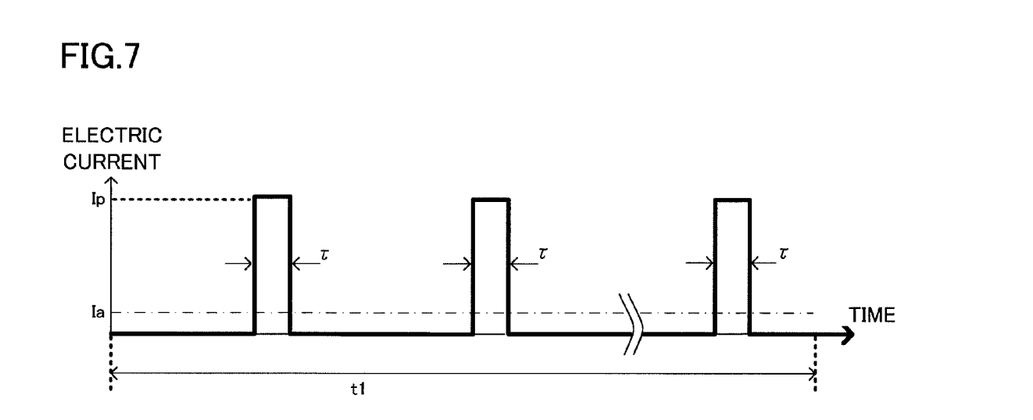
FIG. 7 is a view showing a relationship between a pulse current and an average machining current pulse in the measuring section in FIG. 6.

An average machining current pulse and an electric discharge frequency are detected in an average machining current pulse detecting unit and an electric discharge frequency detecting unit, during a set measuring period t1, after the machining proceeds to an area of the measuring section 82. The average machining current pulse when the machining is actually performed during the measuring period t1 is set to Ia, and the electric discharge frequency is set to b. A time width of a pulse of a pulse current contributing the machining is set to τ, and is controlled with an ON time of the switching element. A relationship among them is shown in FIG. 7.

Here, as one example, computation is performed by a computing unit as follows:

$$\int_0^{t1} I_a dt = b \times \int_0^{\tau} I_p dt \tag{1}$$

wherein generally, a value of the pulse current contributing the machining is not constant, however, it is assumed, for simplification, that the value of the pulse current is set to a fixed value Ip, and the fixed value Ia is adopted even in the average machining current pulse. Then, the above expression (1) can be developed as the following expression (2).

$$I_p = \frac{I_a \times t_1}{b \times \tau} \tag{2}$$

The value Ip determined as mentioned above is compared with a peak current Ip(std) that is set when deciding machine standard conditions stored in the memory unit 73, and a ratio k thereof is determined according to the following expression (3).

$$k = \frac{I_p}{I_{p(std)}} \tag{3}$$

On the other hand, on the assumption that an impedance of a whole of the electric discharge route is Z1, it can be considered that the following relationship is established between Ip and Z1.

$$I_p = \frac{E}{Z_1} \quad (4)$$

Here, by compensating an electric voltage E of the machining power source 3 to E' as follows, Ip becomes equal to the peak current Ip(std) at the time of acquiring the standard machining conditions.

$$E' = \frac{E}{k} \quad (5)$$

Data for compensating the voltage E of the machining power source 3 to E' is stored, and the compensation data is set in the machining power source 3 from the numerical controller 71 before the main machining is started.

Second Embodiment

A second embodiment of the wire electric discharge machine is approximately the same as the first embodiment of the wire electric discharge machine mentioned above in its configuration and function, however, a computing method of compensating the electric voltage of the machining power source 3 is different from the first embodiment.

A difference ΔI between Ip which is determined according to the above expression (2) and the electric current Ip(std) at the time of deciding the machine standard conditions stored in the memory unit 73 is obtained.

$$I_{p(std)} - I_p = \Delta I \ (I_{p(std)} = I_p + \Delta I) \quad (6)$$

Further, on the assumption that an impedance of a whole of the electric discharge route is Z2, it can be considered that the following relationship is established between Ip and Z2.

$$I_p = \frac{E}{Z_2} \left( Z_2 = \frac{E}{I_p} \right) \quad (7)$$

Here, for the purpose of adjusting Ip to Ip(std) by compensating the electric voltage E to E2, it can be considered that the following expression is established.

$$E_2 = (I_p + \Delta I) \times \frac{E}{I_p} \quad (8)$$
$$= \left(1 + \frac{\Delta I}{I_p}\right) \times E$$

As mentioned above, the electric current Ip becomes equal to the peak current Ip (std) at the time of acquiring the standard machining conditions by compensating the electric voltage E to E2. Data for compensating the voltage of the machining power source 3 to E2 is stored, and is set to the machining power source 3 from the numerical controller 71 before the main machining is started.

In these embodiments, as the method of compensating the electric voltage of the machining power source 3, the compensation value of the power source voltage is decided on the basis of the ratio or the difference between the reference peak current value and the peak current value which is computed by the computing unit 72, however, the compensation value may be decided according to the other computing methods. Further, in these embodiments, the value of the pulse current is set to the fixed value for simplification, however, it is possible to compute without setting any fixed value.

The invention claimed is:

1. A wire electric discharge machine for applying electric voltage between a wire electrode and a workpiece while changing a relative position between the wire electrode and the workpiece, the wire electric discharge machine comprising:
    a first detecting unit configured to detect an average electric current;
    a second detecting unit configured to detect an electric discharge frequency;
    a determining unit configured to determine, when starting a machining, whether or not the machining is a machining in an approach up to a machined shape required as a product;
    a computing unit configured to, when the determining unit determines that the machining is carried out in the approach,
        set, in the approach, a measuring section for measuring the average electric current and the electric discharge frequency when the machining is carried out in the measuring section, and
        compute a peak current when the machining is under way, on the basis of the average electric current and the electric discharge frequency detected when the machining is carried out in the set measuring section;
    a memory unit configured to store a reference peak current;
    a comparing unit configured to compare the peak current computed by the computing unit with the reference peak current stored in the memory unit; and
    a compensation voltage calculating unit configured to calculate an electric voltage of a machining power source for compensating the peak current at a portion where machining of the machined shape is carried out, on the basis of a result of comparison by the comparing unit.

2. The wire electric discharge machine according to claim 1, wherein the determining unit is configured to determine whether a machining route is the approach or not on the basis of a code in an NC program of the wire electric discharge machine.

3. The wire electric discharge machine according to claim 1, wherein, when the determining unit determines that the machining under way is the machining in the approach, the computing unit configured to set a section, in which a control dedicated for the approach is not valid, as the measuring section.

4. The wire electric discharge machine according to claim 1, wherein the computing unit is configured to compute the peak current when machining is under way, on the basis of
    an integral value of the average electric current, and
    an assumption that the peak current at a time when the average electric current and the electric discharge frequency are measured is constant.

5. The wire electric discharge machine according to claim 1, wherein the compensation voltage calculating unit is configured to calculate the electric voltage of the machining power source on the basis of a ratio between the peak current computed by the computing unit and the reference peak current stored in the memory unit.

6. The wire electric discharge machine according to claim 1, wherein the compensation voltage calculating unit is configured to calculate the electric voltage of the machining power source on the basis of a difference between the peak current computed by the computing unit and the reference peak current stored in the memory unit.

7. The wire electric discharge machine according to claim 1, wherein
 the determining unit is configured to determine, when starting a machining, whether or not the machining is a machining in an approach up to a plurality of machined shapes each required as a product, and
 the compensation voltage calculating unit configured to calculate the electric voltage of the machining power source for compensating the peak current at a portion where machining of each of the machined shapes is carried out.

8. The wire electric discharge machine according to claim 1, further comprising a numerical controller connected to the first detecting unit and the second detecting unit, the numerical controller comprising the determining unit, the computing unit, the memory unit, and a computing unit having the comparing unit and the compensation voltage calculating unit.

9. A method of computing a compensation value of the machining voltage by the wire electric discharge machine according to claim 1, comprising:

when the machining is started, determining whether a point at which a machining is started is a point located behind the point at which the main machining is started or a point located in front of the point at which the main machining is started;

when the point is determined to be a point located behind the point at which the main machining is started, determining that the point at which a machining is started lies in an approach and setting a measuring section in a section in the approach located behind the point at which the main machining is started, other than sections in which "special dedicated control" is required;

determining whether the machining reaches the measuring section set by the setting, and when the machining reaches the measuring section, and measuring an electric current and an electric discharge frequency at the time when machining is under way are measured;

determining whether the measurement is completed, and when the measurement is completed;
 computing the electric current contributing to the machining on the basis of the result of measurement in the measuring section, and
 computing the compensation value contributing to the machining on the basis of the result of measurement in the measuring section; and
starting the main machining.

\* \* \* \* \*